Dec. 28, 1948.  E. W. SHOCK  2,457,324
EGG CLEANING MACHINE
Filed Oct. 6, 1947  2 Sheets-Sheet 1

INVENTOR.
Escu W. Shock
BY Harold W. Mattingly
Attorney

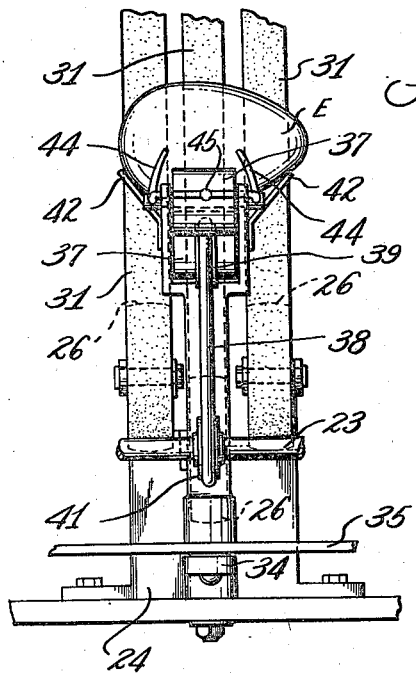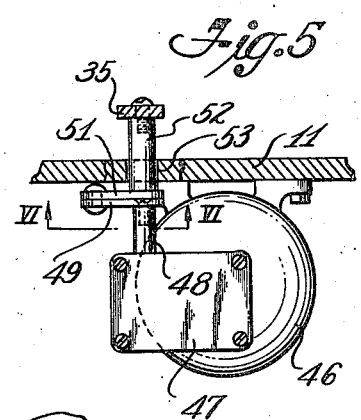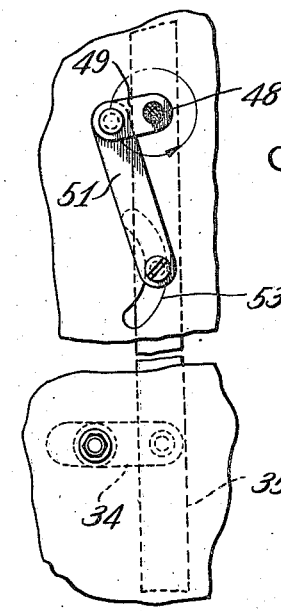

Patented Dec. 28, 1948

2,457,324

UNITED STATES PATENT OFFICE 2,457,324

EGG CLEANING MACHINE

Escu W. Shock, Rogue River, Oreg.

Application October 6, 1947, Serial No. 778,196

10 Claims. (Cl. 51—144)

My invention relates to egg cleaning machines, and has particular reference to an improved type of sanding machine for abrading away dirt located on egg surfaces.

It is customary to clean high-quality eggs to improve their appearance and also sanitation in use, and therefore their market value. It is well known that it is injurious to the keeping qualities of eggs to wash them, and additionally washing is a time-consuming and difficult operation. For these reasons the surfaces of eggs are abraded in a dry condition to remove dirt therefrom. While this abrading is deleterious to the egg in that the shell is weakened and therefore more fragile for handling, a properly designed egg sander will remove all of the dirt with but only slight abrading or thinning of the shell. It is therefore a principal requirement of all egg sanders or abraders that the egg shell shall be only slightly sanded while dirt is removed at the same time from the entire surface of the egg.

My invention provides an egg sanding machine wherein a plurality of endless belts are used for sanding a single egg. Also I provide a cradle for supporting the egg while it is sanded, which cradle includes rotating rollers that in turn rotate the egg and thereby present all surfaces of the egg to the sanding belts. Additionally, my invention incorporates a mechanism for oscillating the cradle so that the egg is oscillated with respect to the path of the belts to thereby contact the entire surface area of the egg.

It is therefore a principal object of my invention to provide an improved egg cleaning machine of the abrading belt type.

Another object of my invention is to provide an egg cleaning machine wherein a plurality of abrading belts are employed for cleaning a single egg.

Another object of my invention is to provide an egg cleaning machine having a cradle for supporting eggs wherein the egg is rotated by means of resilient rollers.

Another object of my invention is to provide an egg cleaning machine wherein a cradle may be oscillated to thereby present all surfaces of an egg to abrading belts.

Still another object of my invention is to provide an egg cleaning mechanism that is susceptible to a battery arrangement wherein a large number of such machines may have a common power drive.

Other objects and advantages of my invention will be apparent in the following description and claims, considered together with the accompanying drawings, in which:

Fig. 4 is a front view of a portion of the egg cleaning machine of Fig. 1;

Fig. 5 is a sectional view along the line V—V of Fig. 1 and illustrating the oscillatory drive mechanism; and Fig. 6 is a bottom view of Fig. 5 as taken along the line VI—VI of Fig. 5.

Figure 1:
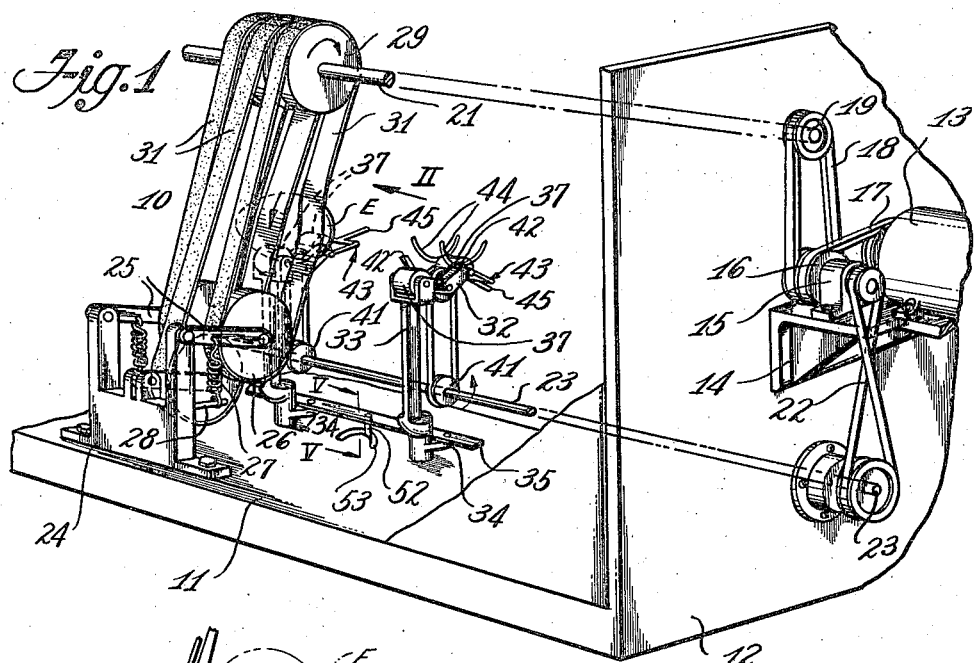
Fig. 1 is a perspective view of a presently preferred embodiment of my invention illustrating the drive of a plurality of machines by means of common drive elements.

Referring to Fig. 1, an egg cleaning machine 10 may have the mechanical parts thereof supported upon a table or other platform 11 which may have a transverse vertical wall 12 for support of a shaft drive motor 13. The vertical wall 12 may include a bracket 14 to which the motor 13 may be secured, and additionally a bearing block 15 may also be mounted on the bracket to receive a pulley and shaft assembly 16. Accordingly a drive belt 17 may drive a shaft belt 18 which in turn drives a pulley 19 secured to a sanding belt shaft 21. Also the drive belt 17 may transmit, through a belt 22, power for an egg rotating shaft 23. Suitable bearings and reduction gears may be employed in the end wall 12 for the shafts 21 and 23.

Mounted upon the table 11 may be a bracket 24 to which may be jointed three pulley supporting levers 25, each supporting a belt pulley 26 at the inner end thereof. Each lever 25 may be engaged by a tension spring 27 having its lower end connected to a pin 28 so as to urge the belt pulleys 26 yieldingly downwardly.

Mounted upon the sanding belt shaft 21 may be a corresponding plurality of belt pulleys 29, each having a narrow sanding belt 31 disposed thereon and passing also around the corresponding pulleys 26. These sanding belts are preferably of the endless type, and are preferably of a small width compared to the axial length of an egg. For example, they may be approximately ⅕ to ⅙ of the axial length of an egg. The tension of the lever springs 27 may be such that the belts may be readily deflected when contacting the curved surface of an egg.

An egg E may be mounted upon a cradle 32, which in turn may be supported upon the upper end of a rotatable post 33 having a projecting crank arm 34 jointed to a connecting rod 35. In this way the cradles 32 may be oscillated to present all surfaces of the egg E to the sanding belts 31.

The construction and oscillation of the cradle 32 may best be explained with reference to all of the figures, and it will be noted that the cradle 32 includes two parallel frame members 36 between which may be mounted rubber rollers 37 which may be rotated in opposite directions by means of a resilient endless belt 38 passing over a pulley 39 disposed between each rubber roller 37. The belt 38 may be driven by means of pulleys 41 mounted upon the egg drive belt 23.

The cradle 32 supports the egg E because of the contact of the rollers 37 with the egg, and in addition the egg may be prevented from working off of the rollers endwise by means of end support fingers 42 which may be connected one to each frame member 36. The egg E may be moved into and out of the cradle 32 by means of a movable basket 43 pivoted on the outer end of the frame plates 36 and including a pair of U-shaped frames 44 mounted on one end of a pivoted, bifurcated handle 45. Each fork of the handle 45 may support one of the U-shaped frames 44, and these two elements may be disposed one on either side of the upper cradle roller 37. As illustrated most clearly in Fig. 2, the egg E may be moved into and away from the cradle rollers by means of the basket 43.

Referring now to Figs. 1, 3, 5, and 6, the apparatus for oscillating the cradles 32 will next be described. Secured to the under surface of the table 11 may be a motor 46, preferably an electric motor, and a reduction gear box 47 may be secured at one end thereof and may include an angularly projecting stub shaft 48. A crank arm 49 may be secured to this stub shaft, and may be pin-jointed to a link 51 which in turn is jointed to a drive pin 52 secured to the underside of the connecting rod 35 and passing through a crescent shaped slot 53 in the table 11. Accordingly, as the motor 46 rotates the stub shaft 48, the link 49 will be moved back and forth, reciprocating with it the connecting rod 35. The pin jointing of the connecting rod 35 to the cradle support crank arms 34 causes the entire cradle 32 to oscillate.

Figure 2:
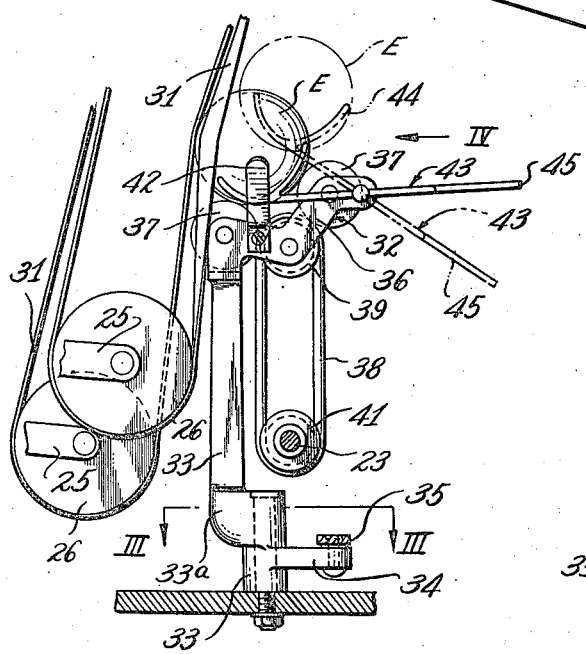
Fig. 2 is an elevation view of a part of the mechanism of Fig. 1.
Figure 3:
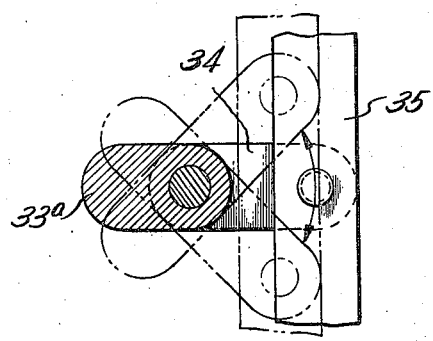
Fig. 3 is an enlarged plan view along the line III—III of Fig. 2 illustrating the oscillatory motion of the egg cradle.

It will be noted, particularly with respect to Fig. 2, that the cradle rollers 37 so dispose an egg that the central part of the egg is disposed toward the belts relative to the pivot axis of the oscillating cradle support post 33. This off-set may be about ¼" (⁵⁄₁₆ preferred) and disposes the center of radius of the sanded surface of the average egg at the oscillation pivot axis. If desired, the post 33 may be off-set as at 33a to facilitate this relationship. It will also be noted that the cradle drive shaft 23 is disposed relatively close to the cradle support axis so that the oscillations of the cradle will not interfere with the drive for the cradle rollers through the flexible belt 38.

In cleaning an egg on the machine of my invention, an operator may first press downwardly on the outer end of the handle 45 of the basket 43, lifting the basket to the elevated position illustrated in broken outline in Fig. 2. An egg may then be disposed in the basket and the egg may then be lowered gently upon the rubber rollers 37 of the cradle 32. Assuming that the drive motor 13 is energized, the egg will be rotated in a counter-clockwise direction with respect to Fig. 2, and at the same time the belts 31 will be rotated in a clockwise direction. This results in the belts and the surface of the egg that is being sanded moving in the same direction, although the belts 31 will be moving at a much faster rate of speed, and this combination of movement and directions assists in maintaining the egg within the cradle 32.

While the belts are passing over the surface of the rotating eggs, an oscillatory motion is imparted to the cradle 32 by means of the drive motor 46 acting upon the connecting rod 35, which in turn rotates the entire post 33. Accordingly, therefore, the curved end portions of the egg E will be presented to the outside sanding belts 31, and these end portions which are ordinarily most difficult to sand are readily cleaned. In this connection it will be noted, particularly with respect to Fig. 2, that the lower belt pulleys 26 for the outer belts 31 are set ahead of or toward the egg with respect to the center belt 31. This closer positioning of the outside belts toward the egg assists in the curvature of the belt over the rounded end portions of the egg, as is clearly illustrated in Fig. 1. At the same time, the middle belt has a stabilizing effect that keeps the end belts from tipping the egg on end.

The tension springs 27 not only accommodate the different sanding pressures as the egg is oscillated, but also provides an automatic adjustment for cleaning eggs of varying sizes. It will also be noted that the lap of the endless belts or the distance between pulleys is greatly in excess of the diameter of an egg, and therefore assists in the flexing of the sanding belts in covering the curved surfaces. Thus long and narrow belts are extremely effective as employed in my invention.

Although one set of belts only is illustrated in Fig. 1, it is obvious from the illustration of the second cradle that my invention is well adapted to battery machine operation; that is, a large plurality of machines may be operated on a single table at one time, all employing common power sources. The number of machines in one battery will depend, of course, upon the skill and dexterity of the operator as to the number of machines controllable by one operator, as well as the amount of dirt on the egg and the abrading speed of the belts.

While I have described my invention with respect to a specific embodiment thereof, it is obvious that modifications and variations could be made therein without departing from the true spirit and scope of my invention. For example, the middle belt may be wider than the end belts without departing from the teaching of the invention. Likewise, the use of the basket is desirable although not necessary, inasmuch as the egg could be inserted by hand in the absence of a feeding mechanism. Also, while I prefer to drive the cradle rollers 37, it will be obvious that the egg could be rotated by the engagement of the sanding belts, and in that case only a frictional retarding action need be applied to the cradle rollers. Accordingly, therefore, the disclosed embodiment of my invention is merely illustrative and is not definitive.

I claim:

1. An egg cleaning machine comprising: a cradle adapted to receive an egg; a pair of resilient rollers disposed in the cradle for rotating the egg about its longitudinal axis; a plurality of sanding belts engaging a surface of the egg that projects from the cradle; and means for oscillating the cradle substantially through the center of an egg to present the curved end portions of the egg to the sanding belts.

2. An egg cleaning machine comprising: a cradle adapted to rotatably support an egg; three sanding belts adapted to engage the surface of the egg, the outer of the three belts being set toward the egg so as to more effectively engage the smaller rounded end portions thereof; a drive for oscillating the cradle to present the curved end portions of the egg to the outer belts; and means for resiliently tensioning the belts so as to accommodate the sanding of the end portions of the egg as well as eggs of different sizes.

3. A cradle for supporting an egg in an egg cleaning machine comprising: a pivotal post; and a pair of resilient rollers mounted on the top of the post and so disposed as to support an egg so that the center of the egg is approximately over the axis of the pivotal post.

4. A cradle for an egg cleaning machine comprising: a pivotal post; a cradle frame disposed upon the upper end thereof; a pair of spaced parallel rollers mounted on the frame; a pulley mounted on the frame intermediate the rollers; and a belt passing around the pulley and contacting the surfaces of the rollers for rotating the rollers so that an egg may be rotated while mounted on the rollers.

5. A cradle for an egg cleaning machine comprising: a pivotal post; a cradle frame mounted on the upper end of the post; a pair of spaced parallel rollers mounted on the frame; and a basket feeder for the cradle comprising a bifurcated handle terminating in upstanding U-shaped members pivoted to the frame so as to dispose an egg between the two rollers.

6. In an egg cleaning machine, an oscillatory cradle comprising: a vertical pivotal post having a crank arm projecting therefrom; a pair of resilient rollers mounted on the upper end of the post; a pair of egg retaining fingers projecting outwardly from the ends of the rollers and mounted to the post; a drive motor having a projecting shaft; a crank arm mounted on the shaft; and a linkage interconnecting the motor crank arm and the post crank arm, whereby the post will be oscillated as the motor rotates.

7. An egg cleaning machine comprising: three pairs of spaced pulleys; endless belts disposed over each pair of pulleys and having a width less than one-third the longitudinal length of an egg; a cradle for rotatably supporting an egg so that a surface thereof will be in engagement with the belts; and means for oscillating the cradle.

8. An egg cleaning machine comprising: three pairs of pulleys wherein the space between each pulley is greatly in excess of the diameter of an egg; endless belts disposed over each pair of pulleys and having a width less than one-third the longitudinal length of an egg; a cradle for rotatably supporting an egg so that a surface thereof will be in engagement with the belts; and means for oscillating the cradle.

9. An egg cleaning machine comprising: a sanding belt drive shaft having a plurality of sets of three rollers each mounted thereon; a corresponding plurality of linkage blocks each having three links projecting therefrom; a pulley mounted on each link; a sanding belt extending between each pulley on the drive shaft and each pulley on the link, the spacing of the belts being such that their outside diameter is approximately the longitudinal length of an egg; a plurality of rotatable posts corresponding in number to the sets of drive pulleys; a pair of parallel resilient rollers mounted on the top of each post; a pulley disposed between each pair of rollers; a drive belt trained over each pulley and having an engagement with each roller; a common drive shaft for the belts; a common connecting rod engaging projecting portions on each post; means for rotating the sanding belt drive shaft; means for rotating the roller drive shaft; and means for reciprocating the connecting rod.

10. An egg cleaning machine comprising: at least one sanding belt; a pivotal post; and a cradle formed on the top of the post for supporting an egg to be sanded by the belt, characterized by a cradle construction that disposes the center of an average egg away from the pivot axis of the post toward the belt so that the center of radius of the sanded surface of the egg is disposed substantially at the pivot axis.

ESCU W. SHOCK.

REFERENCES CITED

The following references are of record in the file of this patent:

UNITED STATES PATENTS

| Number | Name | Date |
| --- | --- | --- |
| 1,475,741 | Brown | Nov. 27, 1923 |
| 2,018,967 | Miller et al. | Oct. 29, 1935 |
| 2,276,581 | Jordan | Mar. 17, 1942 |